US010528365B2

(12) United States Patent
Knox et al.

(10) Patent No.: US 10,528,365 B2
(45) Date of Patent: Jan. 7, 2020

(54) FUNCTION EVALUATION USING MULTIPLE VALUES LOADED INTO REGISTERS BY A SINGLE INSTRUCTION

(71) Applicant: Imagination Technologies Limited, Kings Langley (GB)

(72) Inventors: David William Knox, Bristol (GB); Michael John Davis, Bath (GB); Adrian John Anderson, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 888 days.

(21) Appl. No.: 14/661,376

(22) Filed: Mar. 18, 2015

(65) Prior Publication Data

US 2015/0268960 A1 Sep. 24, 2015

(30) Foreign Application Priority Data

Mar. 18, 2014 (GB) .................................. 1404822.7

(51) Int. Cl.
 *G06F 9/448* (2018.01)
 *G06F 9/312* (2018.01)
 (Continued)

(52) U.S. Cl.
 CPC .......... *G06F 9/4484* (2018.02); *G06F 9/3005* (2013.01); *G06F 9/30043* (2013.01); *G06F 9/3881* (2013.01)

(58) Field of Classification Search
 CPC .. G06F 9/30043; G06F 9/3005; G06F 9/3881; G06F 9/4425; G06F 9/4484
 See application file for complete search history.

(56) References Cited

U.S. PATENT DOCUMENTS

| 5,093,917 A | * | 3/1992 | Campbell | ............. | G06F 9/4425 712/233 |
| 5,923,893 A | * | 7/1999 | Moyer | .................. | G06F 9/3012 712/200 |

(Continued)

OTHER PUBLICATIONS

"Case Study: Activation Records for the MIPS Architecture", Jun. 22, 2012, pp. 1-4, Retrieved from the Internet:<URL: http://lambda.uta.edu/cse5317/notes/node34.html>.*

(Continued)

*Primary Examiner* — David J. Huisman
(74) *Attorney, Agent, or Firm* — Vorys, Sater, Seymour and Pease LLP; Vincent M DeLuca

(57) ABSTRACT

A technique for efficient calling of functions on a processor generates an executable program having a function call by analysing an interface for the function that defines an argument expression and an internal value used solely within the function, and an argument declaration defining an argument value to be provided to the function when the program is run. A data structure is generated including the internal value and a resolved argument value derived from the argument expression and the argument value. A single instruction is encoded in the program to utilise the data structure. When the program is executed on a processor, the single instruction causes the processor to load the argument value and internal value from the data structure into registers in the processor, prior to evaluating the function. The function can then be executed without further register loads being performed.

12 Claims, 3 Drawing Sheets

(51) Int. Cl.
    *G06F 9/30*         (2018.01)
    *G06F 9/38*         (2018.01)

(56) References Cited

U.S. PATENT DOCUMENTS

| | | | |
|---|---|---|---|
| 5,953,741 A * | 9/1999 | Evoy | G06F 9/3824 |
| | | | 711/132 |
| 6,035,394 A * | 3/2000 | Ray | G06F 9/30043 |
| | | | 712/245 |
| 2004/0015925 A1 | 1/2004 | Hansen et al. | |
| 2005/0246680 A1* | 11/2005 | De Oliveira Kastrup Pereira | |
| | | | G06F 8/45 |
| | | | 717/106 |

OTHER PUBLICATIONS

"SFDV4001 OOP with C++", Sep. 9, 2009, 2 pages, Retrieved from the Internet: <URL: http://sfdv4001.wikidot.com/sumoftwonumbers.*
Dewar, "Lecture Material from 201", Jul. 2, 2012, 4 pages.*
cplusplus.com, "Functions (I)", Dec. 27, 2012, 4 pages.*
Chang, "C Function Call Conventions and the Stack", Sep. 24, 2013, 6 pages.*

* cited by examiner

FUNCTION EVALUATION USING MULTIPLE VALUES LOADED INTO REGISTERS BY A SINGLE INSTRUCTION

BACKGROUND

Processors are complex devices that can execute large, multi-part programs that contain code from a variety of sources. For this reason, functions (also called sub-routines) are frequently used to break a program down into more manageable and re-usable pieces. A function is generally arranged as a stand-alone block of program code that can be called as needed by other parts of a program to perform a certain operation.

However, some processors are not arranged to execute function calls in an efficient way. For example, certain special-purpose processors may be configured to perform signal processing tasks in a highly optimised manner. Such special-purpose processors may have an instruction set that is targeted at performing highly efficient mathematical operations, but which is limited in its ability to handle program organisation.

To improve the performance of function calls on such processors, the programmer writing the calling program has generally needed to look inside the code of the function being called, and use the knowledge of how the function is operating to optimise the code of the calling program. This is unsatisfactory, as this breaks the "black box" nature of the function, and means that any change to the function code (which could be done without the knowledge of the programmer) could adversely impact the performance of the program running on the processor by counteracting the optimizations, or cause the program to become inoperable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A technique for efficient calling of functions on a processor is described. An executable program having a function call is generated by analysing an interface for the function that defines an argument expression and an internal value used solely within the function, and an argument declaration defining an argument value to be provided to the function when the program is run. A data structure is generated including the internal value and a resolved argument value derived from the argument expression and the argument value. A single instruction is encoded in the program to utilise the data structure. When the program is executed on a processor, the single instruction causes the processor to load the argument value and internal value from the data structure into registers in the processor, prior to evaluating the function. The function can then be executed without further register loads being performed.

There is provided a method of executing a program comprising a function call on a processor, the method comprising: executing a single instruction to cause the processor to load a plurality of values stored in a data structure relating to the function at an address in a memory into a plurality of registers in the processor, prior to evaluating the function; and evaluating the function using the data in the plurality of registers, wherein the data structure comprises at least one argument value for the function and at least one internal value used solely within the function.

There is provided a processor, comprising: an execution unit configured to execute instructions in a program; a memory interface arranged to enable the execution unit to read a data structure relating to a function from an address in a memory, the data structure comprising at least one argument value for the function and at least one internal value used solely within the function; and a plurality of registers accessible by the execution unit, wherein the execution unit is configured to: execute a single instruction to load the at least one argument value and at least one internal value into the plurality of registers, prior to calling the function; and evaluate the function using the data in the plurality of registers.

There is provided a method of generating an executable program from a code file, wherein the program is arranged to call a function when executed on a processor, the method comprising: analysing data describing a programmatic interface for the function, the interface defining an argument expression and an internal value used solely within the function; reading from the code file an argument declaration defining an argument value to be provided to the function when the program is executed on the processor; defining a data structure comprising the internal value and a resolved argument value derived from the argument expression and the argument value from the code file; and encoding in the executable program a single instruction to cause the processor to load the internal value and resolved argument value from the data structure into a specified plurality of registers on the processor.

There is also provided computer readable code adapted to perform the steps of the methods described herein when the code is run on a computer. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
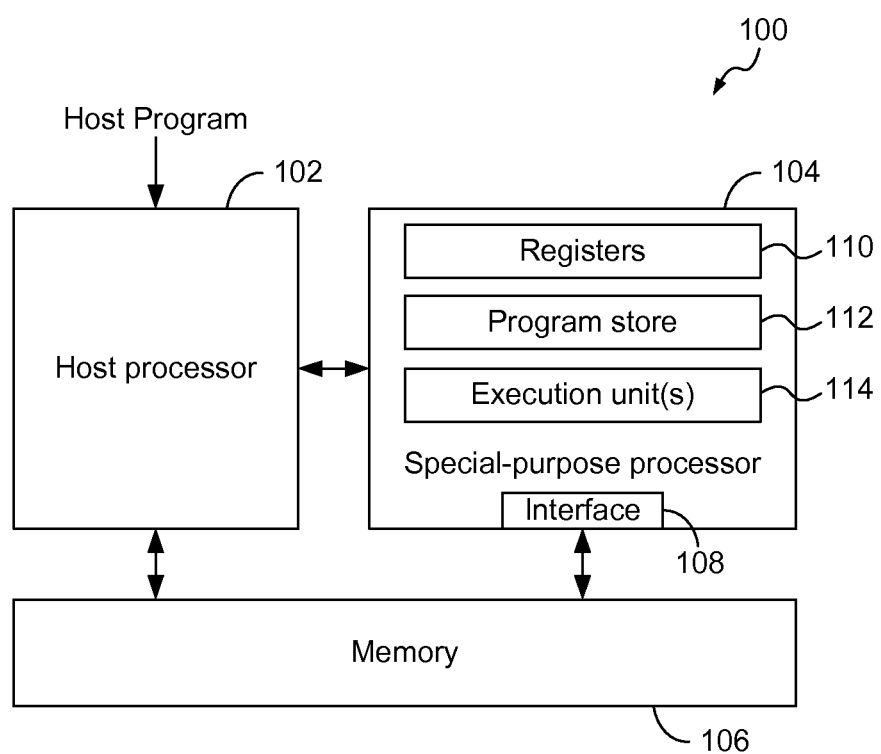
FIG. 1 illustrates an example system comprising a special-purpose processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Described herein is a technique for enabling functions to be called efficiently and quickly on processors that would otherwise incur a significant performance overhead in doing so. Furthermore, this technique enables the function to remain as a "black box", in which the internal code of the function does not need to be known to the programmer of the calling function. This enables the function to be maintained, changed, or optimised, without affecting the operation of programs that call the function. The term "function" is used herein to mean any type of callable unit, such as a subroutine, procedure or method. "Calling" of a function refers to the process of utilising or evaluating the function as part of a wider program by executing the code of the function.

The reason why the calling of functions is inefficient on some types of processor is due to the overhead incurred when loading data from memory into the registers of the processor. "Memory" in this context means storage for information, such as RAM, that is not internal to the execution units of the processor (although may be located on the same chip, die or package as the processor). This may be commonly referred to as "main memory". The memory may also include one or more layers of caching. "Registers" are storage locations that can hold information and are internal to the processor. The processor can access registers more quickly than memory.

A function is typically structured as a block of executable code arranged to perform a specific operation. Many functions take one or more values as inputs on which the function is to operate, and/or may receive an indication of where one or more output values should be written. The externally-provided inputs and outputs to the function are called the function arguments. The arguments define an external interface to the function, such that the calling program need only specify the arguments in order to use the function.

To execute the function, the processor needs to have values (which may be in the form of data or an address of a storage location) for each of the arguments in its registers. Therefore, at some point before or during the function call, the processor loads the argument values from the memory to the registers. The load operation involves the processor copying the data from the specified memory location to a given register, and is typically a slow operation compared to other instructions (such as mathematical operations). The argument values may be located in several different memory locations, and separate load operations may be needed for each one. The different memory locations may result in fewer access-time gains being achieved from caching.

Furthermore, in addition to the arguments, the function will frequently also make use of values that are entirely internal to the function. For example, the function may utilise one or more constants (e.g. address offsets, maximum counter values, etc.) which are not relevant outside of the function, and are not exposed as an argument. Similarly, one or more variables may be used within the function (e.g. scratch space, intermediate values, etc.), which are solely internal to the function's operation. Therefore, the calling program has no knowledge of these internal values without looking into the function code. As with the arguments, the internal values need to be loaded from memory into the processor registers. Because these are internal to the function, these load operations occur while the function is being executed by the processor. As this is a slow operation, this impacts the performance of the operation of the function. The internal values may also be located in several different memory locations, with separate load operations needed for each one, which can result in lower numbers of cache hits.

The technique described herein reduces the performance impact of register load operations for both a function's arguments and internal values without requiring the calling program to have knowledge of the internal operation of the function. It does this by enabling the function to define an interface that includes information on all of the arguments and internal values used in the function. This interface is used when building an executable program to create a data structure that includes all the values used by the function when it is called. When the program is executed on a processor, the data structure can be read from a contiguous block of memory to obtain all the values for the function arguments and internal values. The processor can utilise a single instruction to cause all of the values from the data structure to be loaded into the required registers, prior to calling the function.

By loading all the registers from the data structure with a single instruction, significant performance increases are achieved. Parallelism between the load operations can be exploited, such that the load operations can be performed concurrently. This can particularly be the case with very long instruction word (VLIW) and/or multiple instruction multiple data (MIMD) processors. Furthermore, if the data structure is arranged in a contiguous block of memory, then the register load instruction can be made more efficient and access times can be improved through caching of the data, as cache hits are more likely.

This performance improvement is also achieved without requiring the calling program to know about the internal values of the function, and enables the function to be changed without affecting the calling program. Because the interface is part of the function, the programmer of the function can make changes that affect the internal values, and then update the interface accordingly. The tool that builds the executable program (e.g. the assembler, as described in more detail below), can automatically adapt to these changes and ensure that the data structure still provides the values required for the function prior to it being called. Therefore, the calling program can be used unchanged, but still maintain the performance improvements, even though the function has been altered.

In other words, this provides a mechanism for the function to publish enough information about the internal values used inside the "black box" for optimizations to be made when calling the function, without needing to fully open the "black box" of the function and expose the code used within it. This is all handled automatically by the tool that builds the executable program and the instruction that loads the registers, so that the programmer does not need to be aware of how the function is operating.

Before describing the operation of this technique in more detail, reference is first made to FIG. 1, which illustrates an example system in which the function calling optimizations may be applied. The system 100 comprises a host processor 102 and a special-purpose processor 104. The host processor 102 may be a general purpose processor such as a CPU, and in this example system is responsible for executing a program and is configured to operate in conjunction with the special-purpose processor 104. For example, host processor 102 may be arranged to pass certain processing tasks to the special-purpose processor 104. The host processor 102 can be coupled to the special-purpose processor 104 via a host interface, enabling the exchange of signals and/or data between the processors.

In the example shown in FIG. 1, the host processor 102 and the special-purpose processor 104 are both connected to a memory 106. Although the example of FIG. 1 shows a shared memory, in other examples separate memories could be utilised by the host processor 102 and the special-purpose processor 104. The memory 106 can store any suitable type of data/information, such as numerical data for processing, program code, address data etc. The special-purpose processor 104 is communicably connected to the memory 106 via a memory interface 108, enabling the special-purpose processor 104 to read data from and write data to the memory.

Within the special-purpose processor 104 are a plurality of registers 110, a program store 112 and one or more execution units 114. The plurality of registers 110 are arranged to store data being used by the execution units 114 during processing. The program store 112 is arranged to store program code that is being executed by the special-purpose processor 104.

In the example system of FIG. 1, the special-purpose processor 104 is a processor that does not execute function calls in an efficient manner, and hence can benefit from the optimizations presented herein. For example, the special-purpose processor 104 may be a high performance signal processor which has an instruction set architecture optimised for performing mathematical operations, but is limited in its ability to handle program organisation. In one example, the special-purpose processor 104 may provide high performance by using MIMD operations and very long instruction words. In another example, the special-purpose processor 104 may be a specialised high performance graphics or image processing device having similar constraints.

In operation, the host processor 102 receives a host program comprising instructions that the host processor 102 can execute. This may involve reading from and/or writing to the memory 106, and performing general-purpose operations. In addition, the host program may comprise one or more programs that are intended for execution on the special-purpose processor 104. The programs for the special-purpose processor 104 may be in the form of a binary or text representation that has been generated by an assembler tool, and the binary or text representation inserted into the host program. When the host processor 102 wishes to execute one of these programs on the special-purpose processor 104, the program is provided to the special-purpose processor 104 by the host processor 102. For example, the program can be stored in the memory 106, in a location known to the host processor 102.

The host processor 102 can load at least a portion of the program into the program store 112, and instruct the special-purpose processor, via the host interface, to execute the instructions in the program using the execution units 114, which comprises reading/writing data to the registers 110 and/or the memory 106. The program may contain one or more function calls, the handling of which is described below. Following the execution of the program on the special-purpose processor 104, data may be returned to a specified address in memory 106, and subsequently used by the host processor 102, or further operated on by the special-purpose processor 104, as required.

Figure 2:
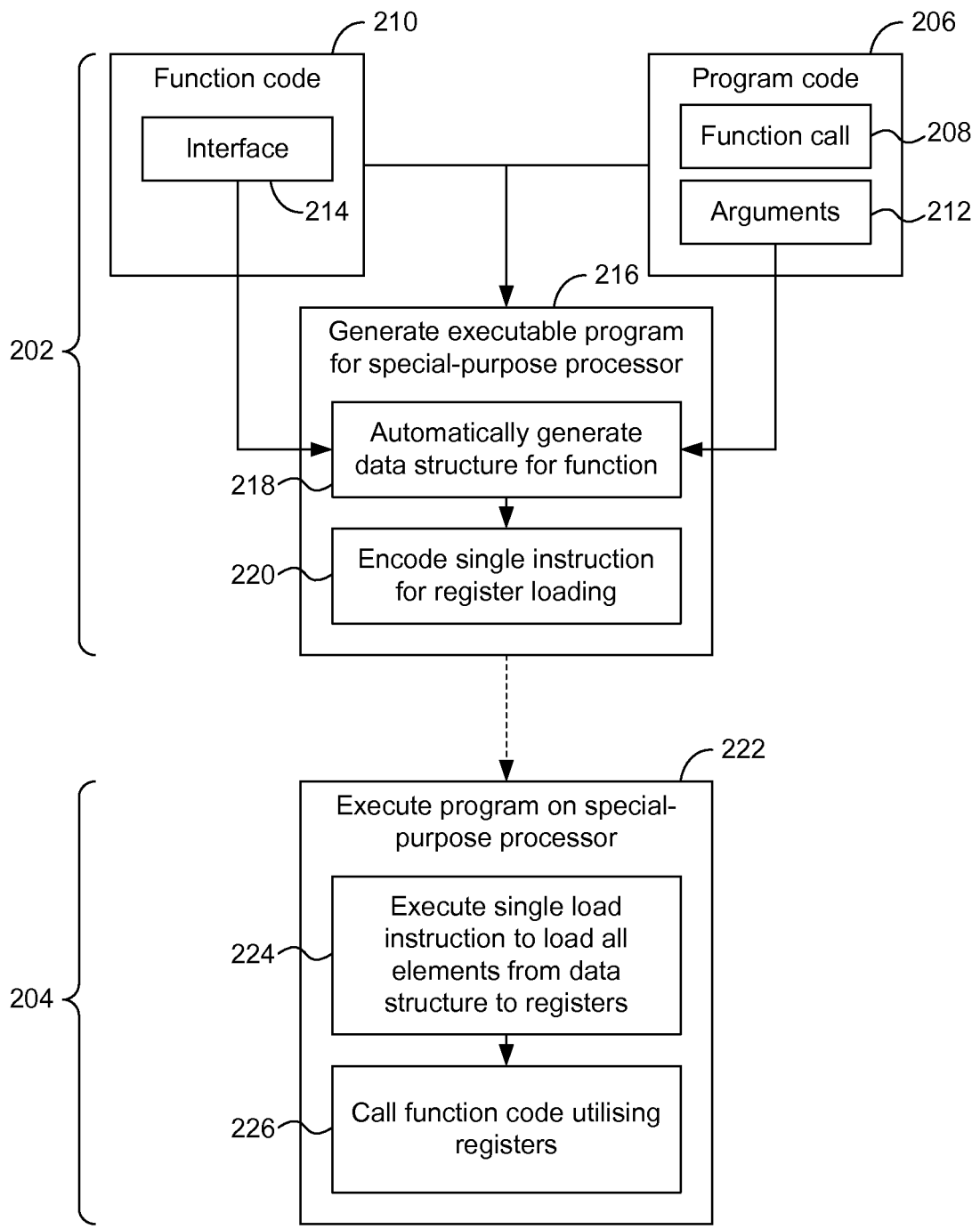
FIG. 2 illustrates a process for assembling a program comprising a function call and executing the program on a processor.

Reference is now made to FIG. 2, which illustrates a process for generating/assembling a program comprising a function call and executing the program on a processor, such as the special-purpose processor 104. The first portion 202 of FIG. 2 describes the process for taking program code written by a programmer and automatically generating an executable program suitable for running on a processor. The second portion 204 of FIG. 2 describes the process performed by the processor when executing this generated executable program.

In this example, a programmer has written program code 206 which, when assembled, can be executed on the special-purpose processor 104 and causes the special-purpose processor 104 to perform a particular operation or calculation.

In the examples presented here, the program code 206 is written in assembly language, although in alternative examples the code could be written in another source code language (e.g. a suitable high-level language). The program code 206 may be stored in the form of a code file that can be read by an assembler (or other program build tool, such as a compiler). This program code 206 comprises a function call 208 to function code 210. The function code 210 may be specified in a different code file or code library, or may be located in a different part of the program code 206. The function code 210 may also have been written by a different programmer, and the programmer of program code 206 may not know how function code 210 operates internally.

The program code 206 comprises an argument declaration 212, which defines the arguments that are to be provided to the function specified in function code 210, when the function is called during execution. The arguments in the argument declaration 212 may be defined as constants (e.g. numerical values or addresses) or as symbols representing values that are defined elsewhere in the program code. In some examples, the argument declaration 212 may be defined in a separate portion of the program code 206 to the function call 208.

The function code 210 comprises a programmatic interface 214, which includes information relating to both the arguments of the function and its internally used values. In one example, the interface 214 is written by the programmer of the function code 210 and is part of the function code 210. The interface 214 includes at least one argument expression, which relates one or more symbols used to name the function arguments to a register in the processor. The argument expression may also include one or more operations that are to be performed on one or more symbol values. For example, the interface 214 can specify that the function requires a symbol called _INBUF1 be loaded to register 0 by including the expression reg0=_INBUF1. In another example, the interface 214 can specify that the function requires a symbol called _LENGTH to have the constant 4 added to it and loaded into register 3 by including the expression reg3=_LENGTH+4.

Any suitable mathematical operations can be performed using one or more constants on the one or more symbols as part of the argument expression. By including the operation performed on the symbol as part of the argument expression, the result of the expression can be determined when the program code is assembled and loaded into the register in the required form prior to the function call. Without the use of the argument expressions, the one or more constants would otherwise be hidden within the function, and need to be loaded into registers separately when the function is executed to allow the operation on the symbol to be performed. It should be noted, however, that argument expressions do not always include constant operations, and can, in some examples, be a simple equality specifying the symbol to be loaded to the register without any mathematical manipulation.

In addition to the one or more argument expressions, the interface 214 further includes a definition of one or more internal values used solely within the function. The definition of the internal values relates one or more constants and/or symbols used only within the function to a specified register. For example, the interface 214 can specify that the function requires the constant 2 to be used in the function, and that is to be loaded into register 4 by stating reg4=2. By exposing the internal values of the function in the interface, the loading of the register with the internal value can be performed prior to execution of the function, as described in more detail below.

In step 216, the assembler or build tool begins to generate an executable program for the special-purpose processor by reading in the program code 206 and the function code 210. To generate the executable program, the assembler/build tool translates the program code 206 and function code 210 into machine code instructions for the processor. This comprises resolving symbols used in the program code 206 and function code 210 to values (e.g. constants or addresses) and translating instructions to opcodes.

As part of the generation of the executable program, the assembler or build tool automatically performs some optimizations to enable the special-purpose processor to efficiently execute the function call 208 in the program code 206. In step 218, the assembler/build tool reads the argument declaration 212 and the function interface 214, and automatically generates a data structure in the program that comprises values derived from the argument declaration 212 and the interface 214. Generating the data structure comprises resolving the argument expressions in the interface 214 by using the values for the arguments specified in the argument declaration 212. For example, the argument declaration 212 may specify that an argument value having symbol INPUT_A is to be provided to the function as the argument _INBUF1 specified in the interface 214, and the data structure is generated to have the value for INPUT_A at the location corresponding to the argument _INBUF1. Similarly, if the argument expression comprises mathematical manipulation of the argument, then the assembler calculates the result of the expression and includes the resultant value in the data structure. This is performed for all the argument expressions specified in the interface 214.

Generating the data structure further comprises including the internal values for the function in the data structure. For example, if the interface 214 comprises the internal value definition reg4=2, then the constant value 2 is included in the data structure. This is performed for all the internal values for the function specified in the interface 214.

As a result of this, a data structure is generated that comprises resolved values for each of the items specified in the interface 214. In other words, all the arguments and internal values needed by the functions are determined and grouped together in the data structure. In one example, the generation of the data structure can comprise expanding the argument declaration 212 from the program code 206 to include the internal values, and updating the values in the argument declaration 212 in accordance with the argument expressions. This means that the data structure is incorporated into the program code 206, and thus translated into the machine code instructions of the executable program as part of the assembly process.

The assembler/build tool can also generate information defining how and where the structure is to be located in the memory 106 when the program is executed. For example, the assembler can place the various values in a specific order, such as in the sequence required by the special-purpose processor's multiple register load instructions. The assembler can also place the various values such that they will be located in consecutive memory locations. In other words, the overall data structure can be stored in a contiguous block of memory. This can provide caching benefits, as outlined below. The data structure definition can, in some examples, also specify a start address in memory for the data structure to be created.

In some examples, the program code 206 may be written such that one or more symbols cannot be resolved to a value such as a specified number, address or constant when the code is assembled/built. In such instances, the assembler/build tool can instead reserve space for the value in the data structure, for when it is calculated at run time.

As well as defining the data structure, in step 220 the assembler/build tool also translates the function call 208 in the program code 206. The assembler/build tool encodes in the executable program a single instruction that causes the processor to load all the values from the data structure to a specified plurality of the registers 110. The single instruction can comprise an address or pointer for the data structure in memory, and also a list of registers to which the values should be loaded. The list of registers can be in the form of a register mask. The list of registers can be generated by the assembler/build tool with reference to the interface 214 of the function code 210. The interface 214 specifies the registers that are to be loaded for all of the arguments and internal values, and this can be translated into the register mask. As a result of this, an instruction is encoded that includes the location of all the values (arguments and internal) required to evaluate the function, and the registers to which the values should be loaded.

In some examples, the instruction to call the function can also be encoded along with the single instruction to load the registers. For example, if the special-purpose processor is a VLIW processor, then large, compound instructions can be used. The function call instruction from the program code can then be incorporated into the single instruction to load the registers. In alternative examples (such as non-VLIW processors), the function call instruction can be encoded as a separate instruction immediately subsequent to single instruction to load the registers in the program.

Once the assembler or build tool has completed the generation of the executable program, including the definition of the data structure, the program is outputted. The executable program can be in the form of binary code that can be directly interpreted by the special-purpose processor. Alternatively, the executable program can be encoded in another form, such as text, which can be included within a different program, such as a host processor program.

As mentioned, the second portion 204 of FIG. 2 illustrates a process for executing the program on the special-purpose processor 104. In step 222, the processor begins execution of the program by reading machine code instructions and executing them in turn. In one example, the program may be stored in the memory 106, and the host processor 102 copies the program from memory 106 to the program store 112 of the special-purpose processor 104. The special-purpose processor 104 can then begin reading instructions from the program store 112 and executing them. In one example, in the system of FIG. 1, the host processor 102 may initially store the executable program in memory 106 and notify the special-purpose processor 104 of its location. In other examples, the executable program may be stored in memory by a different device, or may be pre-loaded there.

When the program is executed, the data structure comprising the arguments and internal values is located at a predefined address in the memory 106. In one example, this can be as a result of the data structure being part of the executable program itself, and the executable program being located in memory.

Alternatively, the data structure can be stored in a predefined memory location as part of an initialization routine of the program.

The execution of the program can involve several steps and operations, including reading from and writing to memory, loading and storing registers, and performing mathematical operations on data. At some point in the execution of the program, in step 224, the processor reaches the single instruction that loads the data structure values into the registers 110. As noted above, this single instruction can comprise an address or pointer for the data structure in memory, and also a list of registers to which the values should be loaded (which can be in the form of a register mask). Therefore, the processor knows where the data structure can be found, and it knows where to put the data from the data structure.

When executing the single instruction, the processor reads each value (be it an argument value or an internal value for the function) and loads that value into the corresponding register in the register mask. As a result of this being structured as a single instruction, the processor can perform this as one operation, such that at least a portion of the loads from memory into the registers are performed concurrently. Furthermore, because the data structure has grouped the values in memory, for example in consecutive memory locations, there is a much higher likelihood that the values in the data structure will be present in a cache structure, and hence can be accessed more quickly.

The relationship between the values in the data structure and the particular registers loaded can be made implicit in the instruction. For example, the instruction can be arranged to cause the processor to load the first 16 bits from the data structure into the first register in the register mask, the second 16 bits from the data structure into the second register in the register mask, etc. When the instruction was generated, this can be achieved by the assembler/build tool ensuring that the bits set in the register mask match the selection of registers listed in the interface 214, and that the ordering of items in the data structure matches the order of register loads performed by the special-purpose processor's multiple load instruction.

When all the argument values and internal values for the function have been loaded into the registers, then the function can be called and evaluated in step 226. Because all the argument values and internal values are already loaded into the registers needed by the function (as defined by its interface 214), the function can now be evaluated without any further register loads being needed. This can significantly improve the performance of the function, and allow the function to perform, for example, a high performance signal processing task without incurring delays due to register loading.

In the example of the processor being a VLIW processor, then the call instruction for the processor can be grouped with the instruction to load the registers. In this case, the single instruction to load the registers also instigates the function call, and subsequent evaluation of the function. In another example, such as a non-VLIW processor, the function call instruction can be a separate instruction to the single instruction to load the registers, and can be executed immediately subsequent to the single instruction.

When the evaluation of the function is complete, the function may write one or more values to a specific location, such as a memory address, and the function exits and control returns to the main program. The memory address to which a result value is written may be specified as one of the arguments, as mentioned previously.

In one example, several separate functions can be chained together efficiently using the above described technique. For example, the data structure for one function can be located in a first block of memory, and the data structure for a second, subsequent function is located in a second block of memory immediately adjacent to the first block. By doing this, a pointer can be easily maintained that moves from the start of the data structure for one function to another as the functions are executed. This enables the management of the address or pointer to the data structures to be handled largely automatically when the program is generated, without the programmer needing to manage this. There can also be caching benefits by locating all the data structures for a plurality of functions in a contiguous block of memory.

As mentioned previously, one or more of the argument values or internal values may not be resolvable when the program is assembled/built. In other words, a specific numerical data or address is not known for this value. In such cases, a space is reserved in the data structure for the value to be filled-in when the program is executed. In one example, this can be achieved by the processor writing a value to the reserved location in the data structure prior to the registers being loaded for the function, which can be under the control of another part of the program. Alternatively, in system such as that in FIG. 1, the host processor 102 can be arranged to write (or poke) the value, when known, to the reserved space in the data structure prior to the registers being loaded for the function.

Figure 3:
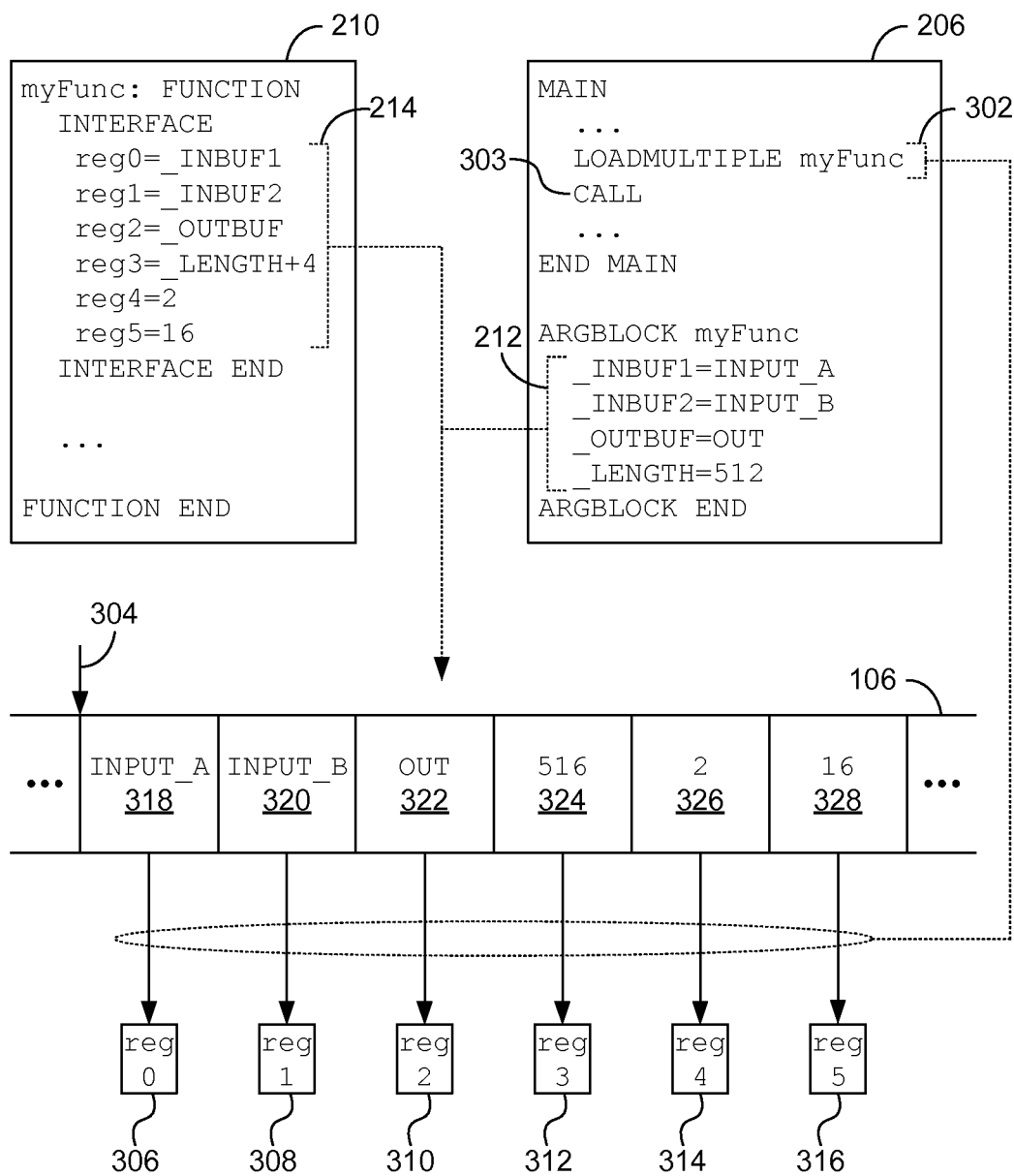
FIG. 3 illustrates an example function and a program calling the function, and the arrangement of data in memory.

Reference is now made to FIG. 3, which illustrates an example function and a program calling the function, and the arrangement of the data structure in memory. FIG. 3 shows an example excerpt of function code 210 and program code 206.

The function code 210 comprises a function name, in this example myFunc, which is used to identify the function and the code for the function is bounded by FUNCTION and FUNCTION END tags. The interface 214 for the function is defined (in this example) at the start of the function code 210, and located between INTERFACE and INTERFACE END tags. In this example, the interface 214 specifies that six registers are used by the function. Four of these registers (reg0 to reg3) are argument expressions. The first three of these relate a symbol to a register. The fourth one relates a symbol to a register with a mathematical manipulation. Two of the registers (reg4 and reg5) are internal values used within the function. These are assigned constant values as part of the interface (values of 2 and 16 in this example). Following the interface 214 the function code 210 comprises the code for defining the operation of the function that utilises the registers in the interface (not shown in FIG. 3).

The program code 206 comprises a main program, denoted by the MAIN and END MAIN tags. Within the main program there may be any suitable instructions, and in this example there are instructions to call the function called myFunc. This is represented by two instructions; a first called LOADMULTIPLE 302 which is the instruction to load all the values into the registers, and CALL 303 which calls the function. As noted, in some processors, these can be aggregated into a single long instruction when encoded in machine code.

The program code 206 also includes the argument declaration 212 for the function myFunc. The argument declaration is denoted by ARGBLOCK and ARGBLOCK END tags, and identifies the function to which it relates. The argument declaration 212 includes entries for each of the symbols in the function interface 214 argument expressions. In this example, the first three arguments are allocated to symbols (which, for example, may be resolved to memory addresses), and the fourth argument is given a constant value (512 in this example).

A representation of the memory 106 is illustrated, showing the data structure created for this function. Also shown is a pointer 304 to the data structure. The six registers 306 to 316 are also illustrated in FIG. 3.

When the executable program is being generated by the assembler/build tool, the argument declaration 212 is resolved, which in this example means the symbols INPUT_A, INPUT_B and OUT are replaced with their address values. The interface 214 is read, and the data structure can be created using the interface 214 and resolved argument values. In this example, the data structure comprises:

the resolved address for INPUT_A in element 318,
the resolved address for INPUT_B in element 320,
the resolved address for OUT in element 322,
the value 516, corresponding to 512+4 in element 324,
the constant 2 in element 326, and
the constant 16 in element 328.

In one example, the data structure can be created by expanding the argument declaration 212 by resolving the arguments values, applying the mathematical manipulations to the arguments where needed, and adding the internal values. A register mask can be created listing reg0 to reg5. The pointer 304 to the data structure is also stored. The single instruction can be encoded in machine language (from the LOADMULTIPLE 302), using the pointer 304 to the data structure and the register mask.

When the executable program is run on a processor, the encoded single instruction is executed, which causes the processor to load all the values from the data structure into the specified registers. For example, in this instance, elements 318 to 328 are loaded from the memory into reg0 306 to reg5 316 respectively. The function call can then be executed to cause the processor to execute the instructions within the function without requiring further register load operations.

Apart from improving the performance of the processor, the above described technique also retains the software maintenance benefits of using functions. For example, the programmer of the function code 210 can change the operation of the function, without affecting program code 206. In the example of FIG. 3, the function programmer can change the function so that it now uses as value of 32 in reg5. The programmer simply needs to update the interface 214 to reflect the change in the interval value, and then the program can be re-assembled. The data structure is automatically updated, and the program will work correctly without the programmer of the main program needing to know of the change.

Generally, any of the methods or techniques described above can be implemented in modules using software, firmware, hardware (e.g., fixed logic circuitry), or any combination of these implementations. In the case of a software implementation, the functionality represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the functionality may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The functionality may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of executing on a processor a program comprising a function call, wherein said function call invokes a function, the method comprising:
    executing a single instruction to cause the processor to load a plurality of values stored in a data structure relating to the function at an address in a memory into a plurality of registers in the processor, prior to evaluating the function; and
    evaluating the function using the plurality of values in the plurality of registers, wherein the data structure comprises at least one argument value for the function and at least one internal value used solely within the function.

2. The method according to claim 1, wherein evaluating the function requires no further loads from the memory to the registers.

3. The method according to claim 1, wherein executing the single instruction causes the processor to load the plurality of values from the memory into a plurality of registers as a single operation, such that at least a portion of the plurality of values are loaded concurrently.

4. The method according to claim 1, wherein the processor is a very long instruction word processor, and the single instruction further causes the processor to call the function once the stored values are loaded into the registers.

5. The method according to claim 1, further comprising executing the function call immediately subsequent to loading the stored values.

6. The method according to claim 1, wherein the data structure is stored in a contiguous block of the memory, starting at the address.

7. The method according to claim 1, wherein the at least one argument value is a constant or a symbol defined previously in the program, and the at least one internal value is a constant.

8. A processor, comprising:
    an execution unit configured to execute instructions in a program;
    a memory interface arranged to enable the execution unit to read a data structure relating to a function from an address in a memory, the data structure comprising at least one argument value for the function and at least one internal value used solely within the function; and
    a plurality of registers accessible by the execution unit, wherein the execution unit is configured to: execute a single instruction to load the at least one argument value and the at least one internal value into the plurality of registers, prior to evaluating the function; and evaluate the function using the values in the plurality of registers.

9. The processor according to claim 8, wherein the processor is a special-purpose processor configured to operate in conjunction with a host processor.

10. The processor according to claim 9, wherein the data structure is written to the memory by the host processor.

11. The processor according to claim 9, wherein the special-purpose processor is a very long instruction word processor or a multiple instruction multiple data processor.

12. A non-transitory computer readable storage medium having stored thereon computer readable instructions that, when executed at a computer system for generating a representation of a digital circuit from definitions of circuit elements and data defining rules for combining the circuit elements, cause the computer system to generate a processor as set forth in claim 8.

* * * * *